2,834,778
// Patented May 13, 1958

2,834,778
DITHIOMALONIC ACID-DIMORPHOLIDE

Hans Feichtinger, Duisburg-Beeck, Germany, assignor to Ruhrchemie Aktiengesellschaft, Oberhausen-Holten, Germany, a German corporation No Drawing. Application January 20, 1956
Serial No. 560,288

Claims priority, application Germany January 22, 1955

9 Claims. (Cl. 260—247.1)

This invention relates to and has as its object the production of dithiomalonic acid-dimorpholide.

It is known from U. S. Patent 2,489,094 that vinyl alkyl ether and sulfur can be reacted with heterocyclic imino compounds such as morpholine, piperidine or pyrrolidine. The reaction with morpholine, for example, proceeds according to the following reaction scheme:

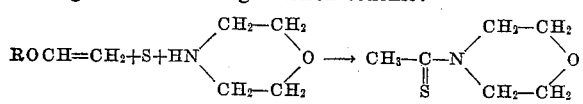

The carbon atom of the vinyl group linked to the oxygen passes over into a thiocarboxylic acid amide group while the terminal $CH_2$ group is reduced to the $CH_3$ group of the forming thioacet morpholide. From both, vinyl butyl ether and vinyl octadecyl ether there could be obtained thioacet morpholide by this known process.

It has been found that the reaction with morpholine and sulfur of propenyl alkyl ethers containing in the olefinic part of the molecules one carbon atom more than the corresponding vinyl alkyl ethers surprisingly proceeds into a completely different direction. In contrast to vinyl alkyl ethers, there is not only one carbon atom converted into the thiocarboxylic acid amide group, but there react two carbon atoms of the unsaturated radical to form dithiocarboxylic acid derivatives, it being particularly surprising that the terminal $CH_3$ group leads to the formation of a thiocarboxylic acid amide group. Dependent upon the number of carbon atoms in the propenyl portion of the propenyl alkyl ether, there are formed thiocarboxylic acid amide derivatives of the malonic acid type.

The reaction in accordance with the invention proceeds according to the following reaction scheme:

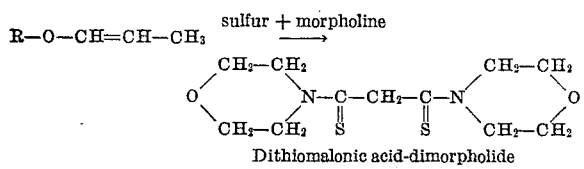

Dithiomalonic acid-dimorpholide

The finished product which, in accordance with the invention, is formed by reacting the propenyl-n-propyl ether with morpholine and sulfur is dithiomalonic acid-dimorpholide, the melting point of which was found to be 208° C. (corrected).

The compound prepared in accordance with the invention could be identified by saponification with dilute sulfuric acid. This resulted in malonic acid, hydrogen sulfide and morpholine. The malonic acid was isolated and unmistakably determined by elementary analysis and by determination of the mixed melting point and the neutralization equivalent.

The dithiomalonic acid dimorpholide is obtained by the reaction in accordance with the invention from any propenyl alkyl ether in which R is an aliphatic saturated radical. R may vary within wide limits in its size and structure and contain from 1 to 10 carbon atoms.

The process of the invention is performed by reacting 1–6 mols morpholine and about 1–10 gram atoms of sulfur per mol of propenyl alkyl ether. In Example 2, by means of a series of tests, there is stated the dependence of the yields of dithiomalonic acid-dimorpholide upon the ratio of morpholine and sulfur to the propenyl-n-propyl ether. The yield increases to as high as 71% of the theory as the ratio increases. The amounts of morpholine and sulfur may, however, exceed the limits given above.

After heating for more than 1 hour with the use of a reflux condenser, the reaction product formed is diluted with the same quantity of a lower alcohol or with another suitable solvent, and then cooled. Upon cooling, the bulk of the dithiomalonic acid-dimorpholide crystallizes out and can be still further purified by filtration and recrystallization. In many applications such as for organic syntheses or for use as pest controlling agent, the raw dithiomalonic acid-dimorpholide may also be directly used without the further purification.

It is preferable in many cases to effect the reaction in accordance with the invention with the addition of solvents. Examples of suitable solvents are hydrocarbons, pyridine, dioxane, saturated ethers and alcohols. With the use of these solvents, the formation of polymerization products during the reaction, which effect a decolorization of the reaction product and a decrease in melting point is largely avoided.

The following examples are given by way of illustration and not limitation:

EXAMPLE 1

87 grams (1 mol) of morpholine and 32.0 grams (1 gram atom) of sulfur, in a three-necked flask, were heated to the boiling temperature with refluxing. 25.0 grams (0.25 mol) of propenyl-n-propyl ether were allowed to drop into the boiling solution in the course of 30 minutes. Thereafter, the heating was continued for further 5 hours in the same manner. The cooled solution solidified to form crystals and was mixed with 100 cc. of methanol, vigorously shaken and thereafter allowed to stand for 8 hours at 0° C. The precipitating dithiomalonic acid-dimorpholide was filtered off, washed with 50 cc. of methanol, and then dried. There were obtained 31.0 grams of dithiomorpholide. Based on the propenyl-n-propyl ether charged, this corresponded to a yield of 45% of the theoretically possible quantity.

The compound was recrystallized from benzene and thereby obtained in the form of matted white needles, the melting point of which was 208° C. (corrected).

Formula: $C_{11}H_{18}O_2N_2S_2$. Molecular weight: 274.39

|   | Calculated, percent | Found, percent |
|---|---|---|
| C | 48.14 | 48.02 |
| H | 6.61 | 6.52 |
| O | 11.66 | 11.71 |
| N | 10.21 | 10.20 |
| S | 23.38 | 23.25 |

The compound was saponified with 50% sulfuric acid within 10 hours. Extraction of the saponification product with ether resulted in malonic acid, the melting point of which was 134° C. (corrected) (mixed melting point, 134° C.). The neutralization equivalent was found to be 53, while the theoretical neutralization equivalent of malonic acid is 52.

EXAMPLE 2

Since the yield of dimorpholide is largely dependent upon the quantities charged of morpholine and sulfur, the effect of these two agents was studied.

In a series of tests 0.250 mol of propenyl-n-propyl ether were heated for 5 hours with various amounts of pulmorpholine (0.50 to 1.50 mols) with refluxing. Upon verized elemental sulfur (1.00–2.00 gram atoms) and cooling, the dark colored reaction product was mixed with 100 cc. of methanol, heated for 15 minutes to the boiling temperature and then allowed to slowly cool for 8 hours to 0° C. in an ice box. After suction filtration, the product was washed with 50 cc. of methanol and the residue was dried until constancy of weight was reached. Dithiomalonic acid-dimorpholide in form of white needles was obtained in varying amounts depending upon the quantities of morpholine and sulfur charged.

The following summary shows the yields obtained in the experiments with varying mol ratios of propenyl-n-propyl ether, morpholine and sulfur.

*Dependence of the yields of dithiomalonic acid-dimorpholide upon the ratio of propenyl-n-propyl ether to morpholine and sulfur*

| Propenyl-n-propyl ether | | Morpholine | | Sulfur | | Reaction time, hrs. | Melting point (corr.) ° C. | Dithiomalonic acid-dimorpholide based on unsaturated ether, percent of the theory |
|---|---|---|---|---|---|---|---|---|
| gms. | mols | gms. | mols | gms. | gram atoms | | | |
| 25.0 | 0.25 | 43.5 | 0.50 | 32.0 | 1.00 | 5 | 203 | 43 |
| 25.0 | 0.25 | 87.0 | 1.00 | 32.0 | 1.00 | 5 | 204-5 | 45 |
| 25.0 | 0.25 | 130.5 | 1.50 | 32.0 | 1.00 | 5 | 206 | 34 |
| 25.0 | 0.25 | 87.0 | 1.00 | 64.0 | 2.00 | 5 | 205-6 | 67 |
| 25.0 | 0.25 | 130.5 | 1.50 | 64.0 | 2.00 | 5 | 205-6 | 71 |

The dimorpholide derived from the synthesis is contaminated by very small quantities of sulfur-containing compounds. Therefore, the melting points range somewhat below 208° C. All of the melting points were measured on the Kofler melting point apparatus.

EXAMPLE 3

87.0 grams (1.0 mol) of morpholine, 40.0 grams (1.25 gram atoms) of sulfur, and 28.5 grams (0.25 mol) of propenyl-n-butyl ether were heated for 3 hours with refluxing. After cooling, the solution was mixed with 100 cc. of methanol, cooled in an icebox, and then filtered off from the solid constitutents. 37 grams of dithiomalonic acid-dimorpholide were obtained as the end product. Based on propenyl butyl ether charged, this corresponded to a yield of 54.0% of the theoretically possible quantity. The melting point of the compound, after recrystallization from benzene, was 204-205° C. (corrected).

EXAMPLE 4

87.0 grams (1.0 mol) of morpholine, 64.0 gms. (2.0 gram atoms) of sulfur, 18.0 gms. (0.25 mol) of propenyl methyl ether and 100 cc. of methanol were heated for 4 hours at 140° C. in a pressure vessel. After the termination of the reaction, the content of the autoclave was cooled to 0° C. and filtered after 8 hours. Dithiomalonic acid-dimorpholide was obtained in a yield of 45 gms. corresponding to 66% of the theory.

EXAMPLE 5

130.5 gms. (1.5 mols) of morpholine, 64.0 gms. (2.0 gram atoms) of sulfur and 35.5 gms. (0.25 mole) of propenyl-n-hexyl ether were heated for 5 hours with refluxing. The cooled solution was mixed with 100 cc. of methanol and the precipitate deposited at 0° C. within 8 hours was filtered off. Dithiomalonic acid-dimorpholide was obtained in amount of 42 grams corresponding to a yield of 61% of the theory.

EXAMPLE 6

87.0 gms. (1.0 mol) of morpholine, 64.0 gms. (2.0 gram atoms) of sulfur, 42.5 gms. (0.25 mol) of propenyl-n-octyl ether and 200 cc. of xylene were boiled for 6 hours in a round-bottom flask with refluxing. Dithiomalonic acid-dimorpholide in amount of 40 gms. corresponding to 58% of the theory was obtained from the cooled reaction product.

The dithiomalonic acid-dimorpholide in accordance with the invention which has been produced for the first time exhibits insecticidal properties. For the preparation of pest controlling agents, the compound obtained according to Examples 1–6 is given the form of a wettable powder or of a dust. Wettable powders are obtained by grinding 90 parts of dithiomalonic acid-dimorpholide as fine as possible and intimately mixing the same with 5 parts of a fatty alcohol sulfonate Na salt and 5 parts of a formaldehyde urea condensation product. By stirring up 5–10 parts of this concentrate in 1000 parts of water there is obtained a suspension which, when sprayed in field tests, was effective against the following noxious insects:

Cabbage fly, *Chortophila floralis* (Fall.)
Blossom beetle, *Meligethes aëneus* (F.)
House fly, *Musca domestica* (L.)
Bean aphid, *Doralis fabae* (L.)
Carrot rust fly, *Psila rosae* (F.)

The application of the novel compound of the invention is by no means limited to the combating of the noxious insects mentioned above. The novel compound may also be used as an acaricide or bactericide.

I claim:

1. A novel compound having the formula $$\begin{array}{c} CH_2-CH_2 \\ O \diagdown \diagup \diagdown N-C-CH_2-C-N \diagdown \diagup \diagdown O \\ CH_2-CH_2 \quad \overset{\parallel}{S} \qquad \overset{\parallel}{S} \quad CH_2-CH_2 \end{array}$$

2. Process for the production of dithiomalonic acid-dimorpholide, which comprises reacting propenyl alkyl ethers of the general formula R—O—CH=CH—CH$_3$ in which R is a saturated aliphatic radical having 1–8 carbon atoms, with morpholine and sulfur.

3. Process according to claim 2, in which said reaction is effected with 1–10 mols of morpholine and 1–20 gram atoms of elemental sulfur per mol of said propenyl alkyl ether.

4. Process according to claim 3, in which in said reaction is effected with 1–6 mols of morpholine and 1–10 gram atoms of elemental sulfur per mole of said propenyl alkyl ether.

5. Process according to claim 2, in which said reaction is effected at a temperature between about 100 and 200° C.

6. Process according to claim 5, in which said reaction is effected with heating to the boiling temperature of the morpholine.

7. Process according to claim 6, in which said reaction is effected in the presence of an organic solvent.

8. Process according to claim 2, in which said reaction is effected in the presence of an organic solvent.

9. Process according to claim 8, in which said organic solvent is a member selected from the group consisting of hydrocarbons, pyridine, dioxane, saturated ethers, and alcohols.

References Cited in the file of this patent

UNITED STATES PATENTS 2,489,094    Levesque _____ Nov. 22, 1949

UNITED STATES PATENT OFFICE
CERTIFICATE OF CORRECTION

Patent No. 2,834,778                                                       May 13, 1958

Hans Feichtinger

It is hereby certified that error appears in the printed specification of the above numbered patent requiring correction and that the said Letters Patent should read as corrected below.

Column 2, line 71, strike out "morpholine (0.50 to 1.50 mols) with refluxing. Upon" and insert the same after "and" in line 72, same column; column 3, lines 42 and 43, for "correponded" read -- corresponded --.

Signed and sealed this 15th day of July 1958.

(SEAL)

Attest:

KARL H. AXLINE                                                      ROBERT C. WATSON

Attesting Officer                                               Commissioner of Patents